United States Patent [19]
Nilsen et al.

[11] Patent Number: 5,657,162
[45] Date of Patent: Aug. 12, 1997

[54] RETROREFLECTIVE ARTICLES WITH MULTIPLE SIZE PRISMS IN MULTIPLE LOCATIONS

[75] Inventors: Robert B. Nilsen, Weatogue; Michael Hanrahan, Danbury, both of Conn.

[73] Assignee: Reflexite Corporation, Avon, Conn.

[21] Appl. No.: 507,599

[22] Filed: Jul. 26, 1995

[51] Int. Cl.⁶ .................................................. G02B 5/124
[52] U.S. Cl. ......................... 359/530; 359/529; 359/531; 359/532; 359/533; 359/900
[58] Field of Search ......................... 359/529–533, 359/900, 515–526; 156/247, 60; 264/1.9; 428/161, 167, 172

[56] References Cited

U.S. PATENT DOCUMENTS

| | | |
|---|---|---|
| Re. 30,892 | 3/1982 | Bingham et al. ............ 428/241 |
| 2,167,149 | 7/1939 | Grote ............................ 40/135 |
| 3,374,044 | 3/1968 | Benson . |
| 3,388,027 | 6/1968 | Altman ............................ 161/4 |
| 3,420,597 | 1/1969 | Nellessen et al. . |
| 3,493,286 | 2/1970 | Bacon, Jr. . |
| 3,496,006 | 2/1970 | Rideout et al. ............... 117/45 |
| 3,567,307 | 3/1971 | Rideout et al. . |
| 3,614,199 | 10/1971 | Altman . |
| 3,684,348 | 8/1972 | Rowland . |
| 3,700,305 | 10/1972 | Bingham . |
| 3,802,944 | 4/1974 | Tung ............................ 161/3.5 |
| 3,924,929 | 12/1975 | Holmen et al. . |
| 3,975,083 | 8/1976 | Rowland . |
| 4,025,159 | 5/1977 | McGrath . |
| 4,082,426 | 4/1978 | Brown . |
| 4,099,838 | 7/1978 | Cook et al. . |
| 4,145,112 | 3/1979 | Crone et al. . |
| 4,153,412 | 5/1979 | Bailey ............................ 8/2.5 A |
| 4,555,161 | 11/1985 | Rowland . |
| 4,618,518 | 10/1986 | Pricone et al. ............... 428/40 |
| 4,637,950 | 1/1987 | Bergeson et al. ............ 428/168 |
| 4,763,985 | 8/1988 | Bingham . |
| 4,801,193 | 1/1989 | Martin . |
| 5,229,882 | 7/1993 | Rowland ....................... 359/530 |
| 5,412,187 | 5/1995 | Walters et al. ............... 219/728 |

FOREIGN PATENT DOCUMENTS 2 245 985  1/1992  United Kingdom .

*Primary Examiner*—James Phan
*Attorney, Agent, or Firm*—Hamilton, Brook, Smith & Reynolds, P.C.

[57] ABSTRACT

Retroreflective sheeting and articles are formed in which the size of the retroreflective and non-retroflective surfaces may be varied across an array of microprisms. This is accomplished by varying the location of the reflective coating applied to the microprism side facets, such that, some prism side facets are completely coated with reflective material while others are coated only at the apex area; and still others are coated with a non-reflective coatings, such as, a colored adhesive.

15 Claims, 3 Drawing Sheets

RETROREFLECTIVE ARTICLES WITH MULTIPLE SIZE PRISMS IN MULTIPLE LOCATIONS

BACKGROUND OF THE INVENTION

Retroreflective sheet material is widely employed for a variety of safety and decorative purposes, and is particularly useful when the need for night time visibility is significant under conditions of low ambient light. In retroreflective materials, the light rays impinging upon the front surface are reflected back towards the source of the illumination in a substantially parallel path. In situations where headlights or search lights on boats and aircraft are the only source of illumination, this ability to retroreflect the bulk of the rays falling thereon is especially significant for warning signs.

Among the applications for such retroreflective materials are reflective tapes and patches for clothing of firemen, reflective vests and belts, bands for posts and barrels, traffic cone collars, highway signs, warning reflectors, and the like.

In U.S. Pat. No. 4,801,193 granted Jan. 31, 1989 (incorporated herein in its entirety by reference), there is described in detail a partially retroreflective sheet producing process in which grid patterns of metallized and unmetallized prisms are formed, and the use of adhesive spacing to provide an air backing for unmetallized prisms.

U.S. Pat. No. 5,229,882 granted Jul. 20, 1993 (incorporated herein in its entirety by reference) describes in detail a process for producing retroreflective microprism material providing a visual coloration, wherein some of the microprisms have a retroreflective interface and the remainder have a colored non-reflective coating thereon.

As a result, light rays entering the front or base face which impinge upon the prism side facets having retroreflective interfaces are redirected so that they exit the material in a parallel path i.e. retroreflect. Light rays which travel to the facets of color coated prisms are refracted from those prisms and impart a visual coloration to the material in daylight and ambient light.

SUMMARY OF THE INVENTION

In accordance with the present invention, retroreflective sheeting and articles are formed of multiple size prismatic reflectors located in multiple locations. The multiple size reflectors are formed by selectively applying a reflective coating to the side facets of selected portions of microprisms in an array, followed by application of a colored adhesive coating to the uncoated facets of the array.

Certain of the prism facets in the array are only reflectively coated in the tip area of the prism facets, where the side facets meet at the apex. Such prisms will retroreflect like a small prism versus areas where the entire prism side facets surface is coated. Uncoated areas with a colored adhesive backing will diffusely reflect light.

The pattern of reflecting coating applied can be of any shape or format, can be random in shape or format, or can be registered so that the prism facets are coated in a precision pattern. The coating is preferably a metallic reflective coating of material, such as, aluminum, silver, copper, etc.

The result is a retroreflecting material which creates a uniform light pattern (the result of the different size retroreflecting prism facets created) and a material that has a high degree of color (the result of the colored adhesive wetting the transparent uncoated facet surfaces of the prisms).

Alternatively, the adhesive backing can be spaced away from the patterned metallized prism facets to allow an air space so that the index of refraction change from prism material to air allows the uncoated portions of the prism facets to specularly reflect light.

DETAILED DESCRIPTION OF THE INVENTION

Figure 1:
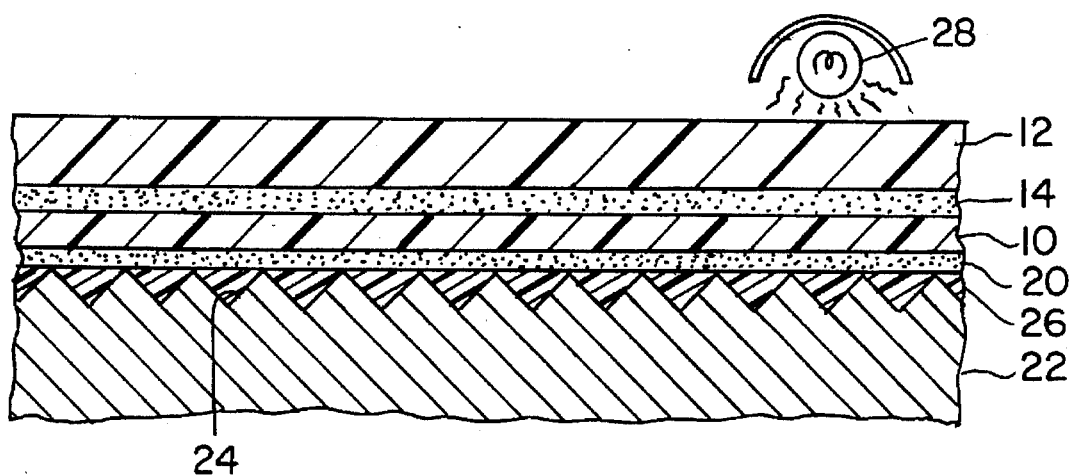
FIG. 1 is a partially diagrammatic illustration of an early step of a prior art embodiment of a process for forming a retroreflective material.

Turning first to FIG. 1, the first steps in the process of the invention is similar to that of the prior art depicted in the aforementioned U.S. Pat. No. 5,239,882. A thin flexible sheet material body member 10 is temporarily laminated to a relatively thick carrier sheet 12 by an adhesive layer 14 which preferentially adheres to the carrier sheet 12. In this step, the thick carrier sheet 12 has been precoated with the adhesive 14 and is passed through the nip of a pair of laminating rollers (not shown) with the body member 10.

In the next step (not shown), the lower or opposite surface of the body member 10 is provided with a thin tie coat 20 of synthetic resin. This coated laminate is then pressed against the surface of a mold 22 with closely spaced microprism recesses 24 formed therein in which is deposited a transparent fluid synthetic resin composition. The assembly is exposed to heat or ultraviolet rays from the lamps 28 to cure the fluid resin composition to form solid microprism formations 26 on the surface of body member 10.

Figure 2:
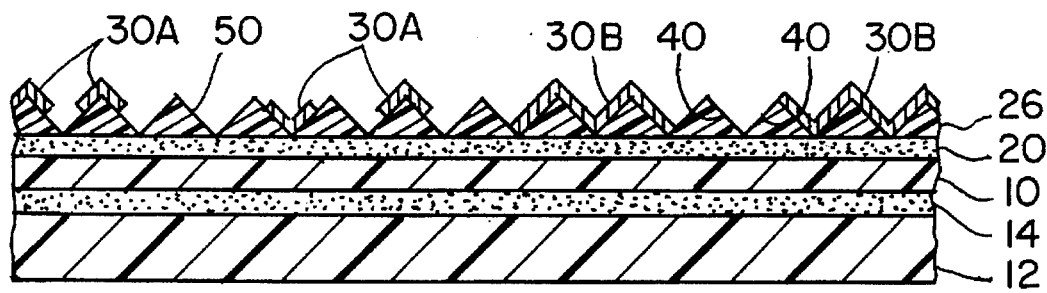
FIG. 2 is a similar illustration of a subsequent step in which a reflective metallic deposit has been formed on certain portion of the microprism formations formed in FIG. 1.

In the illustrated embodiment of the process, the sheet material is stripped from the surface of the mold 22 and inverted, then vacuum metallized or otherwise treated to selectively form transparent reflective metallic deposits 30A–30B on the surface of the microprism formations 26 leaving some prisms 50 uncoated, as seen in FIG. 2.

Figure 3:
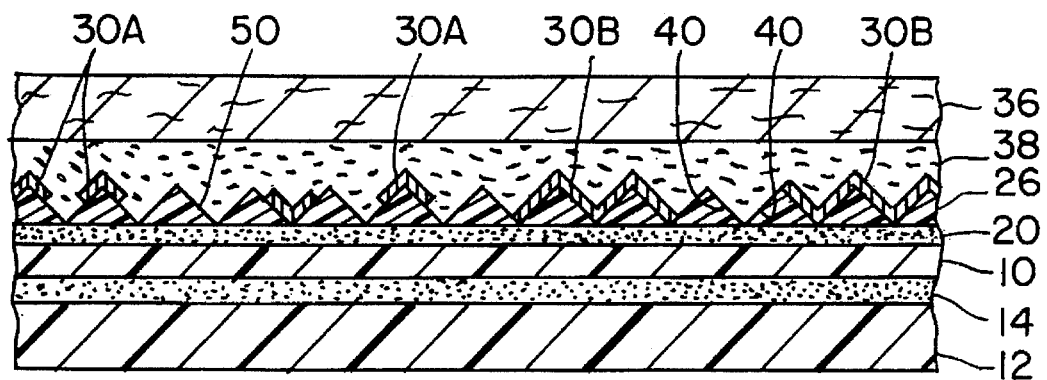
FIG. 3 is a similar illustration showing a colored adhesive coating material deposited over the entire back surface of the sheet material of FIG. 2 and a fabric layer adhered thereto.

In FIG. 3, a laminate is formed in which an optional flexible fabric 36 is bonded to the structure of FIG. 2 by a coating 38 of colored adhesive disposed over the entire surface of the microprism side facets. Thus, this coating 38 is in direct contact with those microprisms 26 which do not have the metallic deposit 30A–30B.

Figure 4:
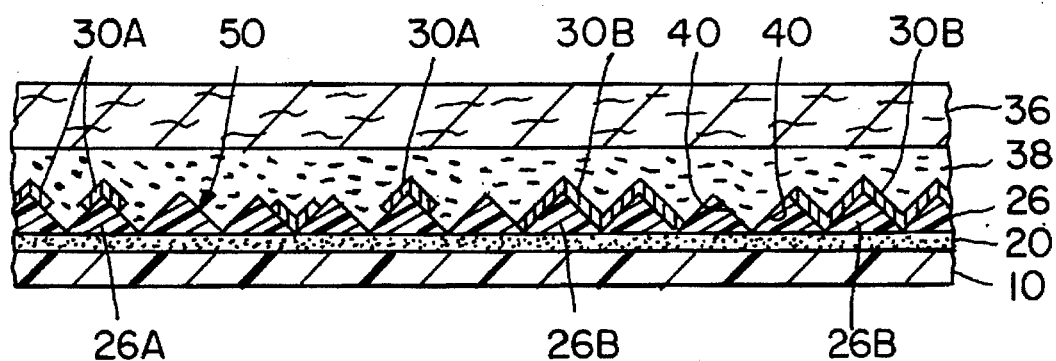
FIG. 4 is a similar illustration showing the removal from FIG. 3 of the carrier sheeting.

In FIG. 4, the carrier 12 and its adhesive bonding layer 14 have been stripped from the transparent body member 10 and sheet 12 supporting the microprism bodies 26.

The microprisms 26 are closely spaced and can be described as cube corner formations. Details concerning the structure and operation of such microprisms may be found in Rowland U.S. Pat. No. 3,684,348 granted Aug. 15, 1972. These microprisms or cube corner formations may have a side edge dimension of up to 0.025 inch, but the preferred structures use edge dimensions of not more than 0.007 inch, and most desirably on the order of 0.005 inch.

The body member of the sheeting will generally have a thickness on the order of 0.010 inch and preferably about 0.006 and 0.002 inch when a highly flexible laminate is to be formed, depending upon the method of fabrication, the resins, and other characteristics desired for the retroreflective sheeting.

The microprism sheeting may be formed by casting prisms upon a film surface functioning as the body, as described above, or by embossing a preformed sheeting, or by casting both body and prisms concurrently. Generally, the resins employed for the microprism sheeting are cross linked thermoplastic formulations, and desirably these resins provide flexibility, light stability, and good weathering characteristics. In some instances, the front face of the retroreflective sheeting may be provided with a protective coating such as by application of a lacquer or other coating material. Suitable resins for the retroreflective sheeting include vinyl chloride polymers, polyesters, polycarbonates, methyl methacrylate polymers, polyurethanes and acrylated urethanes.

To protect the relatively thin body member during processing, the relatively thick carrier temporarily bonded thereto will generally have a thickness of 0.005–0.008 inch. The adhesive used to effect the bonding therebetween preferentially adheres to the carrier and is conveniently a silicon adhesive applied to a thickness of about 0.00025–0.0005 inch. When ultraviolet curing of the resin in the prism is employed, the adhesive must be transparent to the light rays. Although various resins may be employed for the carrier, polyesters and particularly polyethylene terepthalate are desirably employed because of their toughness and relative resistance to processing conditions. As with the adhesive, the carrier should be transparent to the ultraviolet radiation used to effect curing. Moreover, the surface of the carrier may be treated to enhance the preferential adhesion of the adhesive to the surface of the carrier.

Figure 6:
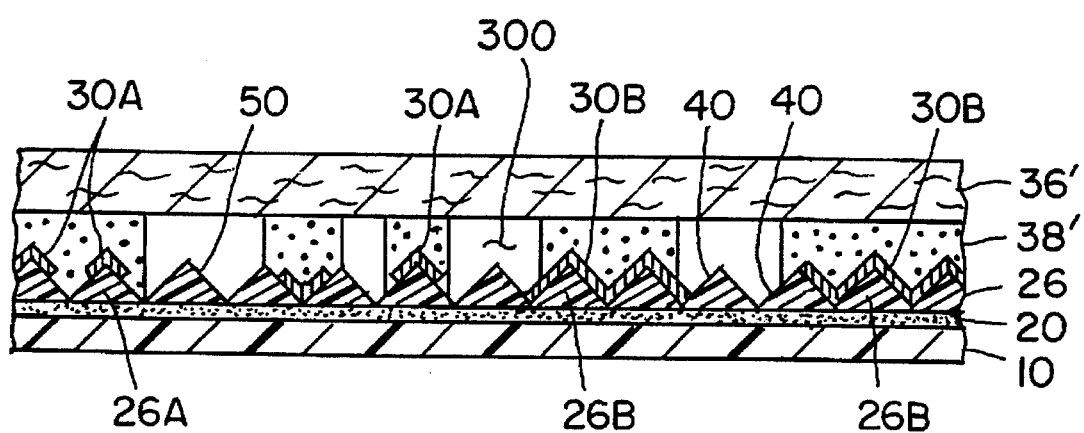
FIG. 6 is an enlarged partial sectional view of an alternate embodiment of the invention.

As is known, the reflective interface for the prisms may be provided by a reflective coating of metal or by an air interface. In the preferred embodiment of the present invention, a reflective coating is provided only upon selected portions of the surfaces of at least some of the microprisms, and such reflective coatings have most commonly been vacuum metallized aluminum deposits, although metallic lacquers and other specular coating materials may also be used. Alternatively, as shown in FIG. 6, the adhesive backing 36' can be spaced away from the patterned metallized prism facets to allow an air space 300 so that the index of refraction change from prism material to air allows the uncoated portions of certain of the prism facets, e.g., prism 50, to specularly reflect light.

In one embodiment, the vacuum metallized prism surface is printed in a coating apparatus with a grid-like pattern.

Pattern metallizing can be used to vacuum coat just the tip of the prism in a number of ways. One way is to create a very small metallized area, in the order of a 0.004" dot or triangles and register the metallizing so that it is on the tip of the prism. Also a random pattern of dots spaced apart by unequal distances can be created such that no mater how the pattern is located on the prism array some of the dots will be located on the tops of the prisms. Another method is to create a pattern that is a series of lines which vary in width, from 0.004" to 0.050" for example, so that some prisms are metallized with a narrow width area and others are metallize with a wider width area. The lines in the pattern would be present in multiple directions, for example three directions 60 degrees apart, and differentially spaced such that no matter how the pattern occurs on the prism array some small, some large and groups of large prisms will be created.

A preferred method of pattern metallizing the deposits 30A–30B of FIG. 2 is to pass the sheeting, upon which the exposed prism formations 26 have been formed, through rollers which cause a negative image in oil of the desired pattern. The sheeting then passes by a metallizing deposition apparatus. The oil pattern prevents local metal deposits, however metal is printed or deposited in regions not covered by oil. (See U.S. Pat. No. 5,412,187, Walters et al., issued 2 May 1995).

In either of the techniques, the result is that some of the microprism facets 40 are partially coated, others are completely coated with the reflective deposit 30A and 30B, respectively, and the remaining prism surfaces 50 are free from any reflective coating.

A colored non-reflective light dispersive adhesive coating 38 is then applied over the entire prism surface and directly coats the side facets of unmetallized prisms or prism portions. Thereafter, the backing fabric material 36 is applied.

In an alternate embodiment as shown in FIG. 6, a colored adhesive 38' is applied in a pattern to the prism surfaces and to a depth greater than the height of the prisms. When the backing fabric 36' is laminated thereto, it is spaced from the prisms by the adhesive 38' and this provides an air interface 300 about the uncoated prisms 50, so that light may be retroreflected therefrom.

The backing 36 may be a woven or laid fabric, or a flexible, durable polymeric material. Suitable resins include polyethylene, polypropylene, polyurethanes, acrylated polyurethanes and ethylene/vinyl acetate copolymers. Polyester and urethane fabrics may be employed as well as those of natural fibers such as cotton. Flame retardants may be incorporated in the adhesives as well as in the fabric backing 36 to impart flame retardance to the retroreflective material.

Although other metals may be used to provide a specular metal deposit including silver, rhodium, copper, tin, zinc, and palladium, the preferred and most economical processes utilize aluminum vacuum deposition. Other deposition techniques include electroless plating, electroplating, ion deposition and sputter coating.

The step of adhering the backing to the retroreflective sheeting may simply involve passing the adhesively coated retroreflective sheeting through the nip of a pair of rolls together with the backing material 26 to apply the necessary pressure to effect adhesion. If a heat activatable adhesive is employed, the retroreflective sheeting may be subjected to preheating prior to passage through the rolls, or the rolls may be heated to achieve the necessary activation. However, it is also practicable to employ ultrasonic welding and other techniques to bond the backing material to the retroreflective sheeting by the material of the backing material itself when it is thermoplastic.

To provide a coloration to the retroreflective light at night, a dye may be incorporated in the resin used to form the body member 10, or the tie coat 20, or even the prisms 26. As an alternative to a dye and as an effective necessity in some resin systems, the coloration may be provided as a finely divided pigment which is well dispersed; however, some loss in retroreflectivity will occur as the result of refraction by pigment particles which are directly in the path of light rays.

The different size retroreflective prism surfaces may be observed in FIG. 4 from a comparison of the metal backing 30A on the tips of the prism 26A versus the complete metallization 30B on prism 26B. The un-metallized area 50 between the metallized prism facet areas 30A or 30B which is backed by a colored adhesive 38 forms a diffuse reflecting surface rather than the normal specular refectory surface formed when the prism facets are air backed or vacuum coated with reflective metal coating.

A retroreflective film which consists of one or multiple layers of retroreflective films which are pattern metallized and laminated together with transparent films or adhesives can be made. The laminated films can contain different sizes of prisms in each retroreflecting layer creating excellent short and long distance retroreflective performance. The clear film or adhesive used during the lamination process must have an index of refraction which is close to the index of refraction of the material used to form the prism.

Figure 5:
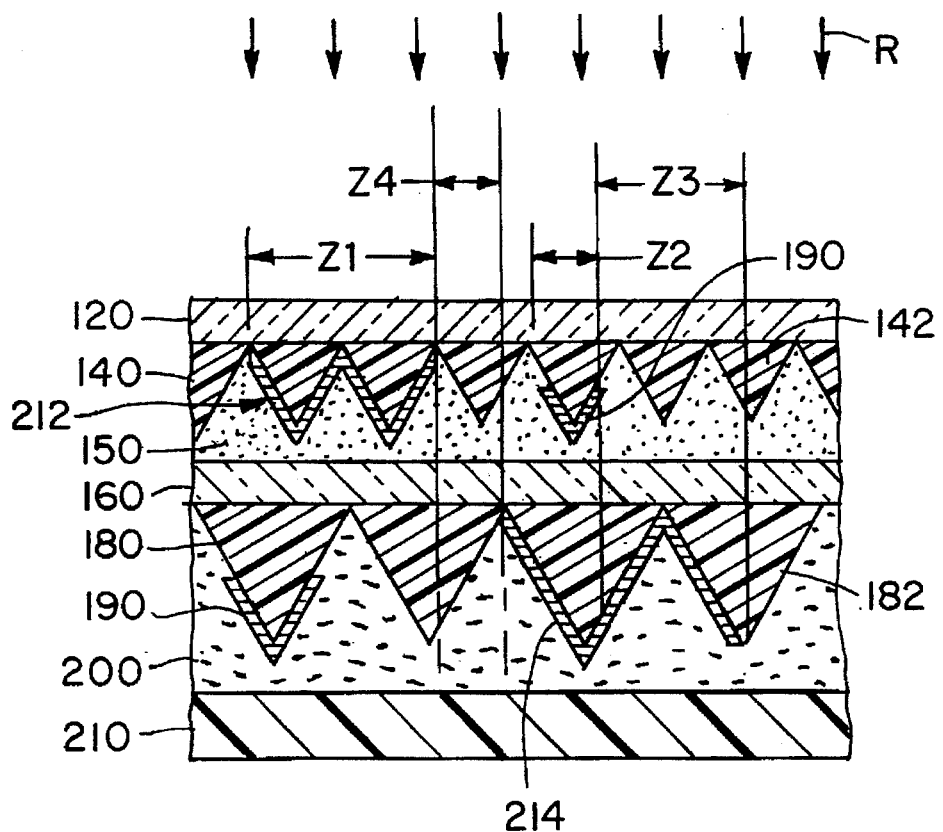
FIG. 5 is a partially enlarged sectional view of an alternate multilayer embodiment of the invention.

An example of one such alternate embodiment is shown in FIG. 5 wherein numeral 120 indicates a transparent top, or outer, film 0.0001" to 0.020" in thickness. Numeral 140 denotes a first prism layer of retroreflecting prisms 142 of a size smaller than the prisms 182 in second prism layer 180. Numeral 150 is a layer of transparent adhesive which has an index of refraction equal (approximately) to the index of a refraction of the prisms 142 in layer 140. Numeral 160 is a layer of transparent film 0.0001" to 0.020" in thickness. A thick film is preferred for this layer. Second prism layer 180 is a layer of retroreflective prisms 182 of a size greater than the prisms 142 in layer 140. An aluminum or other reflective coating 190 is applied to some of the retroreflecting prisms 142 and 182, respectively, in layers 140 and 180 using the previously described pattern metallizing process.

The small reflective coated prisms 142 in layer 140 are approximately 0.001" to 0.005" in pitch and designed to provide wide observation angle performance. The large reflective coated prisms 182 in layer 180 are 0.004" to 0.008 in pitch and provide narrow observation angle performance.

Layer 200 is preferably formed of an opaque white adhesive which bonds prism layer 180 to substrate 210.

In zone Z1 the incoming light rays R will be retroreflected from the large metallized prism reflectors 212 of layer 140. In zone Z2 light rays R are reflected off small prism reflector 190.

In zone Z3 the light will pass through layer 140, because of the index matching adhesive 150 and transparent film layer 160, and retroreflect from the much larger metallized prism facets 214 in layer 180.

In zone Z4 the light will pass through both layers of prisms 140 and 180 and diffusely reflect from the white adhesive layer 200 contributing to the whiteness (Cap Y) of the retroreflecting structure.

The structures described above can be expanded to include more layers of partially metallized retroreflecting prisms. The prism can be of various sizes in each layer, the metallic coating used may be different in each layer, and the area of pattern metallizing in each layer can be varied to change the retroreflecting or whiteness (Cap Y) properties of the overall retroreflecting structures.

The above-described sheeting can be used to form structures, such as traffic control materials, vehicle markings, photoelectric sensors, internally illuminated articles, partially light transmissive signs, directional reflectors, garments and marking.

Equivalents

Having thus described a few particular embodiments of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A method of forming retroreflective sheeting comprising the steps of:
   a) forming an array of microprisms in a sheet of material, the microprisms each having a base facet with side facets extending therefrom and meeting at an apex; and
   b) forming a reflective coating throughout an extended area of the array on (i) all the surface area of the side facets of a first set of the microprisms, and (ii) on a portion of the side facets of a second set of microprisms, thereby forming a relatively small retroreflective microprism surface area on the second set of microprisms, as compared to the larger retroreflective surface area of the first set of microprisms, wherein all the surface area of the side facets are reflectively coated, and leaving any remaining microprism facets with no reflective coating.

2. The method of claim 1 including the step of forming a colored non-reflective coating over some of the facets having no reflective coating.

3. The method of claim 1 including the step of forming an air space adjacent the facets having no reflective coating.

4. A sheeting made in accordance with the method of claim 1.

5. A method of forming retroreflective sheeting comprising the steps of:
   a) forming a first array of microprisms in a sheet of material, the microprisms each having a base facet with side facets extending therefrom and meeting at an apex;
   b) forming a reflective coating on (i) all surface areas of the side facets of some of the microprisms in the first array, and (ii) on a portion of the surface areas of the side facets of some of the microprisms in the first array and leaving the remaining surface areas of microprism facets in the first array with no reflective coating;
   c) forming a first transparent coating over the first array;
   d) forming a second array of microprisms in a sheet of material, the microprisms each having a base facet with side facets extending therefrom and meeting at an apex;
   e) forming a reflective coating on (i) all surface areas of the side facets of some of the microprisms in the second array, and (ii) on a portion of the surface areas of the side facets of some of the microprisms in the second array and leaving the remaining surface areas of microprism facets in the second array with no reflective coating; and
   f) bonding the first and second arrays together.

6. A sheeting made in accordance with the method of claim 5.

7. Retroreflective sheeting comprised of an array of microprisms formed on a sheet, each microprism comprising a solid body having a base side with facet sides extending to an apex, with a first set of said microprisms having the entire surface area of the side facets covered with light reflective material and a second set of said microprisms having the side facets only partially covered with reflective material, thereby forming a relatively small retroreflective microprism surface area on the second set of microprisms, as compared to the larger retroreflective surface area of the first set of microprisms wherein all the surface area of the side facets are reflectively coated.

8. The sheeting of claim 7 wherein some of the prism facets are left completely uncovered.

9. The sheeting of claim 8 wherein a colored backing is bonded to the uncovered facets.

10. The sheeting of claim 7 which comprises a structure selected from the group of structures including traffic control materials, vehicle markings, photoelectric sensors, internally illuminated articles, partially light transmissive signs, directional reflectors, garments and markings.

11. Retroreflective sheeting comprising:

a) a body member having a planar face and an array of closely spaced microprisms each having a base adjacent said planar face from which side facets extend which intercept at a tip;

b) a reflective interface extending throughout the entire array of said microprisms in a pattern over selected portions of the side facets of a first set of microprisms such that certain microprism side facets of said first set have a non-reflective interface while some microprisms of said first set have a reflective interface on all surface areas of the side facets, and microprisms of a second set have a reflective interface on only a portion of the surface area of the side facets, thereby forming a relatively small retroreflective microprism surface area on the second set of microprisms, as compared to the larger retroreflective surface area of the first set of microprisms wherein all the surface area of the side facets are reflectively coated; and c) non-reflective covering over the side facet surfaces of some of said microprism facets having no reflective interface whereby lights rays impinging on said first planar face and thereafter impinging upon the base of microprisms having reflective interfaces are retroreflected thereby in the direction from which they came and those impinging upon the base of microprisms having a non-reflective covering are refracted therefrom.

12. The retroreflective sheeting in accordance with claim 11 wherein said reflective interface is comprised of a metallic layer and the non-reflective covering is a colored adhesive coating.

13. The retroreflective sheeting in accordance with claim 11 wherein a fabric is bonded to said coating.

14. The retroreflective sheeting in accordance with claim 11 wherein some of said microprisms having no reflective interface have an air interface formed about substantially the entire side facet surface.

15. The sheeting of claim 11 which comprises a structure selected from the group of structures including traffic control materials, vehicle markings, photoelectric sensors, internally illuminated articles, partially light transmissive signs, directional reflectors, garments and markings.

* * * * *